Aug. 24, 1948.　　　　R. B. KLEINFELD　　　　2,447,508
ENGINE CYLINDER

Filed Feb. 12, 1944　　　　　　　　　　　　3 Sheets-Sheet 1

INVENTOR.
RUDOLPH B. KLEINFELD
BY Woodling and Krost.
ATTORNEYS

Aug. 24, 1948.　　　　R. B. KLEINFELD　　　　2,447,508
ENGINE CYLINDER

Filed Feb. 12, 1944　　　　　　　　　　　3 Sheets-Sheet 2

INVENTOR.
RUDOLPH B. KLEINFELD
BY Hoodling and Krost
ATTORNEYS

Aug. 24, 1948.  R. B. KLEINFELD  2,447,508
ENGINE CYLINDER

Filed Feb. 12, 1944  3 Sheets-Sheet 3

INVENTOR.
RUDOLPH B. KLEINFELD
BY
*Hoodling and Kost*
ATTORNEYS

Patented Aug. 24, 1948

2,447,508

UNITED STATES PATENT OFFICE 2,447,508

ENGINE CYLINDER

Rudolph B. Kleinfeld, West Salem, Ohio

Application February 12, 1944, Serial No. 522,045

2 Claims. (Cl. 123—193)

This invention relates to cylinders for engines designed to be operated by an elastic fluid under pressure. The said engine may, of course, be used also as a pump for compressing an elastic fluid. While the improved design may be described in connection with an engine cylinder, it is to be understood that the invention applies to cylinder liners just as well.

Desirable features in an engine cylinder are simplicity, durability and ease of maintenance, and these features are generally obtained within practical limitations on engines now in use. However, cylinders are deficient in their inability to resist for extended time periods the penetration of combustion gases, dirt and carbon into the space between the piston and the wall of the cylinder. In ordinary engine practice in which the pistons are directly connected to their cranks by a connecting rod, the resulting angularity between the piston connecting-rod and the line of travel of the piston sets up comparatively heavy lateral pressures between the piston and the side walls of the cylinder. The lateral pressures between the piston and cylinder walls of an engine greatly increase the difficulty of maintaining perfect fits and satisfactory lubrication in the cylinder. These difficulties are especially noticeable in engines operated by elastic fluids where high temperatures and pressures are produced in the engine cylinder, and where great attention must be given to lubrication, inasmuch as the expanding mixture of gas and air frequently contains a considerable amount of dust and grit in addition to the varying percentages of carbon. Consequently, as wear develops, carbon is forced in along the side walls of the piston to such an extent that it covers not only the walls of the piston but the piston rings and fills the piston ring grooves so that the required radial movement of the rings in and out of the grooves is prevented, with the result that the hot gases from the engine will pass around the piston rings to thereby burn out the lubricant between the piston and the cylinder wall and overheat and burn the piston surface.

One of the objects of the invention is to provide a cylinder which is simple in construction, durable and which can be economically manufactured and maintained.

Another object is to provide a cylinder wall having a counterbore to prevent breakage of the piston rings.

A further object of the invention is to provide a cylinder construction which will prevent the leakage of combustion gases and passage of gritty carbon beyond the piston rings for a longer period and even after a considerable amount of wear has taken place in the cylinder.

A further object is to provide a cylinder construction which will prevent the overheating and fusing of the piston.

A still further object is to provide a cylinder construction which will permit effective lubrication of the piston and piston rings of the engine for a longer period under normal operating conditions.

Further objects of the invention and novel features of the cylinder construction will be apparent from the following specification when considered together with the accompanying drawings, in which.

Figure 4:
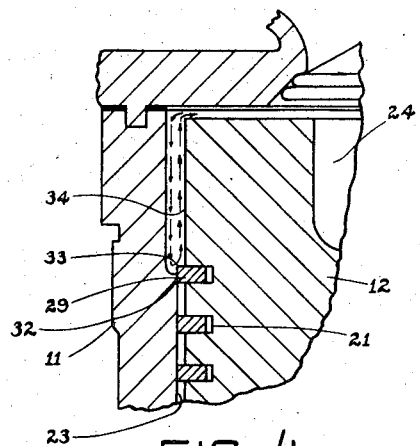
Fig. 4 is an enlarged fragmentary cross-sectional view of a portion of the cylinder liner and piston shown in Fig. 2.

The form disclosed in Fig. 4 constitutes the subject matter of applicant's copending application Serial No. 780,203, filed October 16, 1947.

Figure 1:
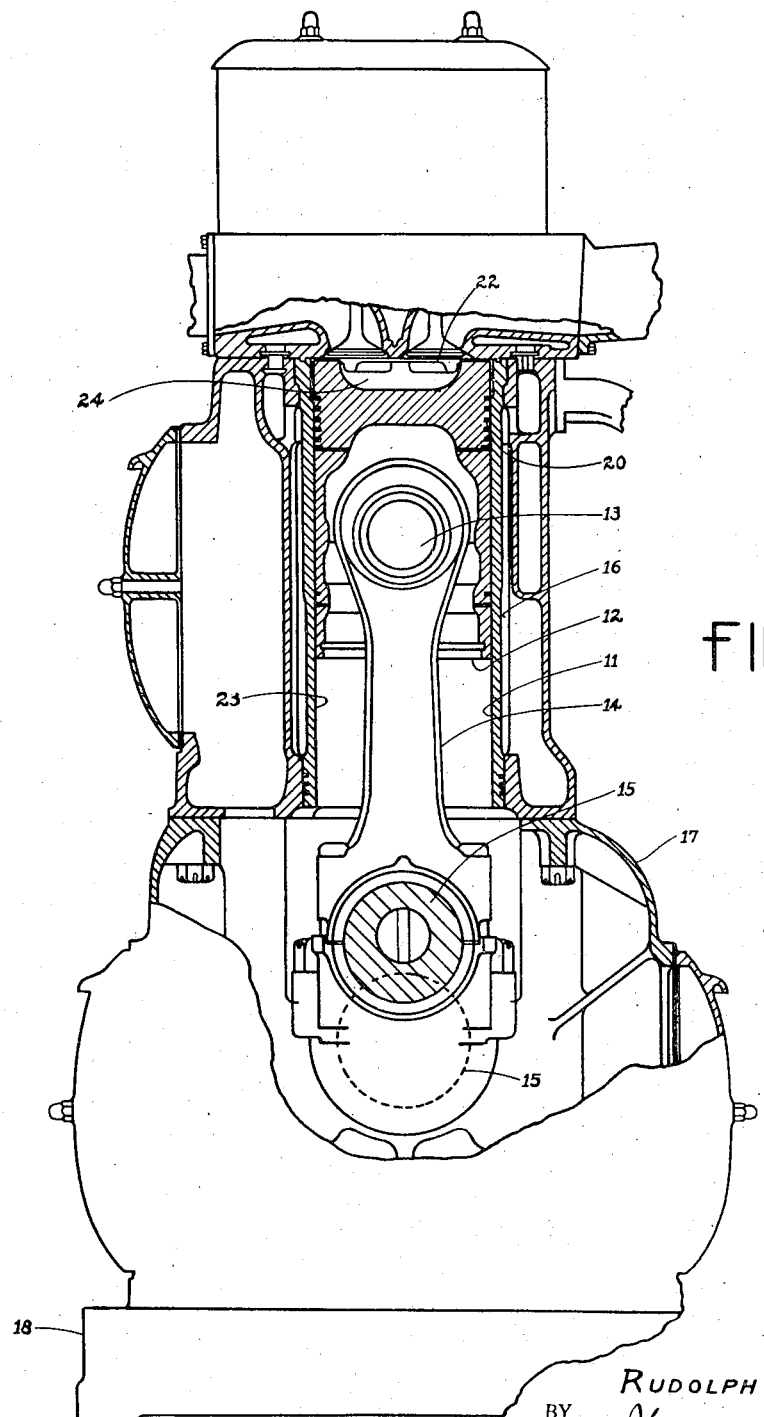
Fig. 1 is a vertical sectional view of a portion of an engine having a cylinder embodying the invention.

In the drawings, I have illustrated in Fig. 1, an engine in which 11 is the cylinder liner, 12 the piston, 13 the wrist pin, 14 the connecting rod, and 15 the crank shaft of the engine. The cylinder liner 11 is surrounded by a water jacket 16, which is continued into the cylinder head. A heavy frame 17 supports the cylinder and is bolted to the bed plate 18. The frame 17 contains the crank shaft bearings.

In the surface of the piston are mounted piston rings 19 and 20, these being normally free for radial movement in suitable ring grooves 21 provided in the surface of the piston in the conventional manner. As the piston reciprocates in the cylinder the piston rings have sliding contact along a portion of the inside surface of the cylinder liner, which portion for the purpose of describing the invention I designate as the working bore of the cylinder. In the particular type of cylinder shown in Fig. 1, the working bore comprises approximately nine tenths of the length of the cylinder. The remaining inside surface of the cylinder is not traversed or contacted by the piston rings, and I designate this portion of the cylinder as the non-working bore of the cylinder. In the type of cylinder shown in Fig. 1, the non-working bore extends from the cylinder head end 22 of the cylinder liner to the working bore of the cylinder, indicated at 23 in Figs. 1, 2, 4 and 5.

In the operation of the engine the first down-stroke of the piston 12 draws in a charge of air alone, into the cylinder 11. On the up-stroke the air in the cylinder is compressed in the compression space 24 to an extremely high pressure and has in consequence a very high temperature. At the end of the up-stroke, a small quantity of oil is blown into the compression chamber 24 where it is ignited by the high temperature of the air compressed in the chamber 24. This injection and combustion of the oil fuel continues during a small fraction of the down-stroke, and the expansion of this hot gaseous mass then continues to the lower end of the stroke, when the exhaust valve opens and remains so during the second up-stroke.

Figure 3:
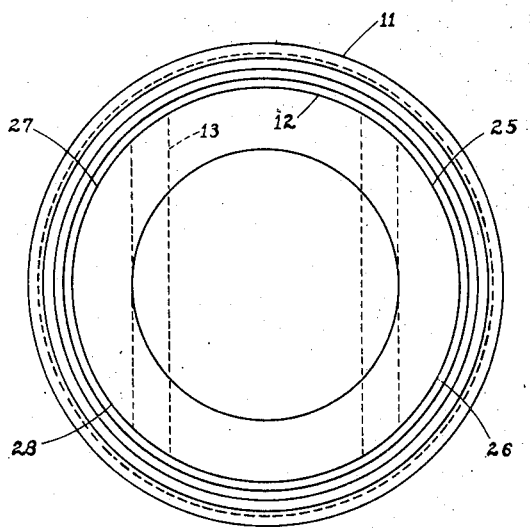
Fig. 3 is an enlarged end view of the cylinder liner and piston shown in Fig. 2.

After an engine of the general type illustrated in Fig. 1 has been in service for a period that portion of the cylinder wall which is subjected to the reciprocating action of the piston rings becomes worn down from its normal surface. In addition to the reciprocating motion the piston also exerts a lateral pressure against the cylinder walls due to the action of the connecting rod on the wrist pin and this pressure is accentuated at the combustion end of the cylinder where the piston changes its direction of motion and in the walls of the cylinder facing the side surface of the wrist pin so that the bore of the cylinder tends to become elliptical at those places, those worn elliptical portions being indicated in Fig. 3 as extending from 25 to 26 on one side and from 27 to 28 on the other side of the bore of the cylinder. As the cylinder wall wears away a ridge is formed in the wall at the point where the piston ring 29, Figs. 2 and 4 nearest the compression space 24 reaches its farthest point of travel from the crank shaft. As the ring 29 repeatedly strikes this ridge, the corner of the ring is worn away until a bevel is formed thereon as indicated by the dotted line 30 in Fig. 6. As this bevel forms on the ring, the latter is wedged into the ring groove with the result that the ring will break up into pieces. One or more of the broken pieces of the ring will soon be forced out of its ring groove and become wedged in between the piston and the cylinder wall thereupon forcing the piston up against the opposite wall of the cylinder. This leaves a comparatively large opening between the piston and one side wall of the cylinder where the flame from the combustion chamber in the cylinder will penetrate, thereby burning the piston. The pieces of the broken piston rings which become wedged between the piston and the cylinder wall often score the cylinder so that it must be re-bored or replaced before the engine can again be operated. I have found upon inspection of Diesel engine cylinders and pistons that have been in service in a Diesel locomotive for a period of 6 to 8 months, that the top rings of several cylinders had been broken, one of them into as many as 27 different pieces. Some of these pieces had actually been doubled over upon themselves, the upper parts of the piston had holes burned in the surface thereof 3" long, 3" wide and ¼" deep, and the cylinders were so badly scored they were unfit for further use. Due to the failure of the top rings the flame and combustion gases had been forced down between the pistons and cylinder walls and large quantities of carbon had been deposited on the piston, on the other lower rings and in the ring grooves to such an extent that the rings and ring grooves were solidly caked in the carbon, thus preventing the normal radial expansion of the rings, and thereby deterring lubrication of the pistons, rings and engine cylinder. This condition of the engine became noticeable when the engine began to lose its power. The engine would speed up at times and then slow down, which in engine parlance is called "hunting." Large quantities of black smoke would appear in the exhaust, indicative of the fact that the engine cylinders were losing compression with the result that unburned fuel oil would be ejected into the exhaust. Upon failure of the top rings and the subsequent burning of a hole in the piston, the compression of the engine became reduced to the point where the fuel injected into the engine would not ignite.

After a careful inspection of an engine damaged in the manner described, I have concluded that one of the principal contributing factors which resulted in this unsatisfactory operating condition, was the ridge formed by the piston ring partway around the cylinder wall at the point where the piston ring nearest the combustion chamber 24 reaches its farthest point of travel from the crank shaft.

As hereinbefore pointed out, the especial object of my invention is, therefore, to provide an engine cylinder on which the formation of the aforementioned ridge or obstruction cannot occur. To accomplish this and the other objects already set forth, an engine cylinder constructed according to my invention is counterbored at the combustion chamber end of the cylinder to a point from ⅓ to ½ of the thickness of the piston ring below the place where the upper edge 31 of piston ring 29 nearest the combustion chamber of the cylinder reaches its farthest point of travel from the crank shaft. In other words, the counterbore may extend throughout the entire length of the non-working bore and slightly into the working bore of the cylinder, but care must be taken to make certain that the counterbore will not be extended in a direction away from the combustion chamber of the cylinder beyond the point of farthermost reach or travel of the lower edge 32 of the top piston ring 29 in the cylinder from the crank shaft. If the counterbore were extended into that portion of the working bore of the cylinder contacted by the lower edge 32 of the ring 29 as viewed in Figs. 4 and 6, then the lower edge of the piston would strike the bottom of the counterbore upon the return stroke of the piston, and thereby soon break not only the ring, but the piston and cylinder as well. I preferably make this counterbore with a diameter approximately equal to the depth to which the cylinder wall will normally be worn by the action of the piston rings. In a cylinder for a Diesel engine which I have used, having a normal inside diameter of 12½" and a length of 30¾", I have found that a counterbore as described having a diameter of 12.521" and a length of approximately 2½" was sufficient and I have successfully operated an engine with all of its cylinders counterbored in this manner for more than 9 months, and there has been no indication of any loss in power or compression and no skipping or back firing of the engine and no variation in the speed thereof. I have also inspected the engine cylinders constructed in accordance with the invention that have been in service for more than 9 months and have found no wear in the cylinders nor in the piston rings, other than normal wear, and while the piston and piston rings and ring grooves were coated with the usual soft coating of dirt and soft carbon, there was no trace whatever of any burning of the piston and no deposits of any of the injurious gritty carbon was found on any of the pistons nor on any of the rings nor in any of the ring grooves. Furthermore, these parts were all properly coated with lubricating oil used in lubricating the engine indicating that a proper distribution of lubricant on these parts had been effected.

Figure 6:
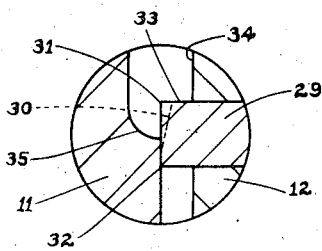
Fig. 6 is a still further enlarged fragmentary cross-sectional view of the cylinder wall, piston and piston ring shown in Figs. 2 and 4, this view showing in particular the position of the piston ring nearest the combustion chamber of the engine cylinder when the piston is in closest proximity to the combustion chamber.

In these same cylinders I also found the counterbore, and the surface of the top ring facing the combustion chamber, this surface being indicated at 33 in Fig. 6, as well as the side wall portion 34 in Fig. 4, of the piston which extends from the piston ring 29 to the end of the piston all comparatively clean and free of any gritty carbon. While I do not wish to be bound by any theory, it is my opinion and belief that these surfaces are kept free from carbon deposits by the turbulence of the combustion gases which enter the counterbored portion of the cylinder and reaching the bottom of the counterbore and the upper ring are deflected back up again from the bottom 35 of the counterbore and the top surface 33 of the upper piston ring 29, and thereby forced out of the cylinder as indicated by the arrows in Fig. 4, thus effectively preventing the admission of these combustion gases and flakes of gritty carbon down past the piston ring 29 to the other rings and lower portons of the piston. It is also my pinion that the additional space afforded by the counterbore in the cylinder exposes the upper surface 33 of the upper ring 29 between the walls of the piston and the cylinder to the full power of the explosion of the engine, thus increasing the force tending to move the piston away from the combustion chamber of the engine.

Figure 2:
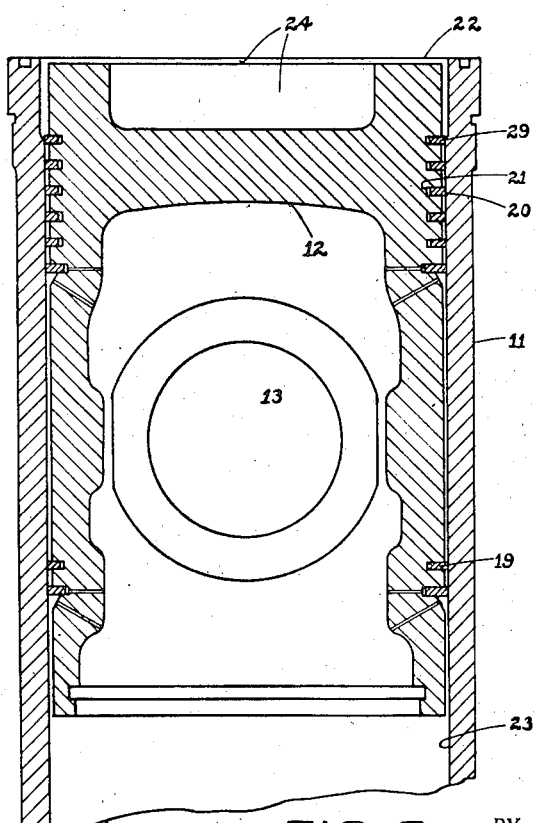
Fig. 2 is an enlarged vertical section of a portion of the cylinder liner and piston of the engine shown in Fig. 1.
Figure 5:
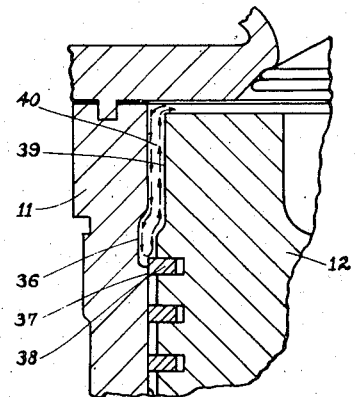
Fig. 5 is an enlarged fragmentary cross-sectional view of a portion of a modified cylinder liner and piston construction embodying the invention.

Instead of extending the counterbore throughout the entire length of the non-working bore of the cylinder wall as shown in Figs. 1, 2 and 4, it will also be within the scope of my invention to only counterbore the cylinder wall in a small portion of the length of the non-working bore thereof as indicated at 36 in Fig. 5, but to nevertheless extend the counterbore slightly into the working bore, care being taken to make sure that the counterbore will not be extended into that portion of the working bore of the cylinder contacted by the lower edge 37 of the ring 38 as viewed in Fig. 5. In addition to counterboring the bore of the cylinder as indicated in Fig. 5, I may also reduce the diameter of a portion 39 of the piston wall extending from a point spaced away from the upper ring 38 so as not to unduly weaken the piston to the end of the piston nearest the combustion chamber so as to provide an annular conduit 40 between the cylinder and piston walls for the free passage for the flow of the expanding fluids or combustion gases in the case of an explosively actuated engine, from the compression or combustion chamber to the counterbore in cylinder wall and back again to the chamber and exhaust, as indicated by the arrows in Fig. 5.

Figure 7:
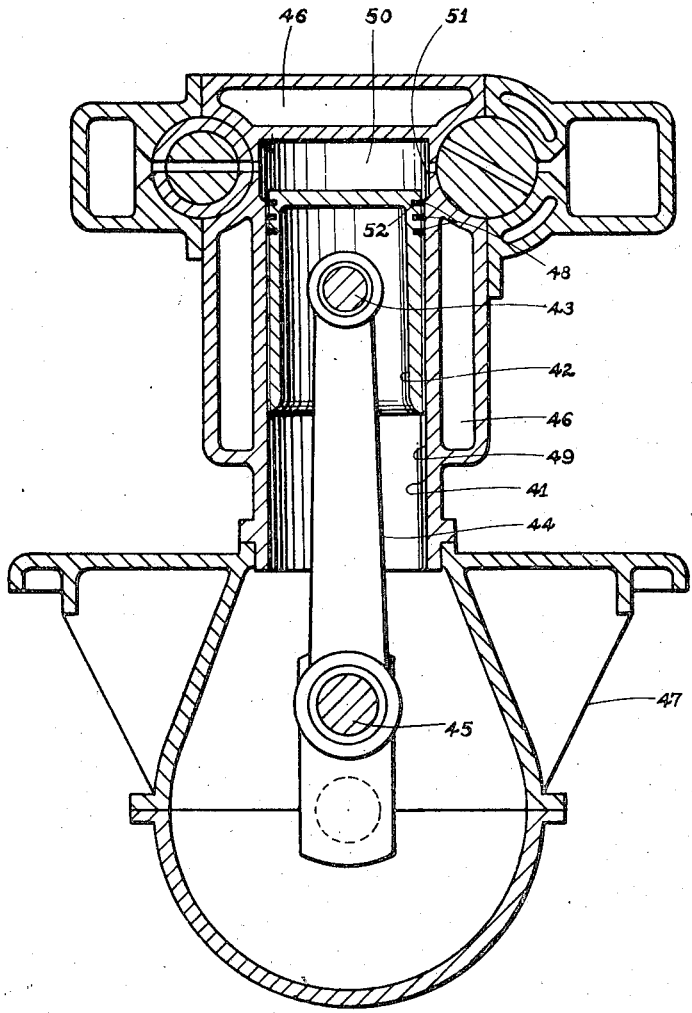
Fig. 7 is a vertical sectional view of a modified form of engine having a cylinder embodying the invention.

As will be understood, the cylinder construction of the invention may be applied to any form of cylinder which is used to enclose a reciprocating element such as a piston or a plunger, or to a construction wherein a cylinder reciprocates over a stationary piston. For instance, instead of applying the counterbore to the liner portion of the cylinder as shown in Figs. 1 and 2, the counterbore might be applied directly to the cylinder body of the engine as illustrated in Fig. 7. In this figure 41 is the cylinder, 42 the piston, 43 the wrist pin, 44 the connecting rod, and 45 the crankshaft of the engine. The cylinder 41 is surrounded by a water jacket 46 which is continued into the head of the engine. The cylinder is supported by a frame 47 which is bolted to a base not shown. The frame 47 contains the crank shaft bearings. In the surface of the piston wall are mounted piston rings 48 these being likewise normally free for radial movement in suitable ring grooves provided in the surface of the piston in the conventional manner. Such a cylinder will likewise have working and non-working bores, the latter being indicated at 49 and the combustion chamber at 50. In the application of my invention to such an engine cylinder, I may counterbore the non-working bore of the cylinder adjacent to the working bore and extend the counterbore slightly into the working bore as indicated at 51, care being taken to make sure that the counterbore will not be extended into that portion of the working bore of the cylinder contacted by the lower edge of piston ring 52 nearest the combustion chamber 50 of the engine.

It is also within the scope of the invention to counterbore the engine cylinder illustrated in this Fig. 7, in a similar manner and to the same diameter and length as in the cylinder liners shown in Figs. 1, 2 and 4 to 6 inclusive. Also, the cylinder construction of the invention could just as readily be applied to the cylinders of a rotary engine.

Although I have described my invention with a certain degree of particularity, it is understood that the present disclosure has been made by way of example and that numerous changes in the details of construction and the combination and arrangement of parts may be resorted to without departing from the spirit of the invention which is defined by the following claims.

I claim:

1. In a cylinder and piston construction having a fluid chamber at one end, a cylinder wall and a piston wall having a clearance space therebetween, said piston wall adapted to have an end thereof in close proximity to the said chamber at predetermined intervals and having an annular groove spaced from the said end with a ring mounted therein, said ring having a flat annular surface contacting the said cylinder wall so as to seal the said clearance space, the improvement comprising a relief bore in the said cylinder wall extending toward the said chamber from a point in the said wall contacted by an intermediate portion of the flat annular surface of the said ring when the said end of the said piston wall is at its closest proximity to the said chamber, said relief bore having a diameter substantially equal to the maximum diameter to which the said cylinder wall will normally be worn by the said ring during the life of the cylinder and having a substantial length, said piston wall having a smaller outside diameter in a portion thereof spaced from the said ring and extending to the said end than in the remaining portion thereof so as to form with the juxtapositioned relief bore and cylinder wall a restricted annular conduit from the said chamber of uniform width and of sufficient length to effect a turbulence to the flow of fluid from the said chamber sufficient to scour the conduit surfaces free of abrasive deposit.

2. In a cylinder and piston construction having a fluid chamber at one end, a cylinder wall and a piston wall having a clearance space therebetween, said piston wall adapted to have an end thereof in close proximity to the said chamber at predetermined intervals and having an annular groove spaced from the said end with a ring mounted therein, said ring having a flat annular surface contacting the said cylinder wall so as to seal the said clearance space, the improvement comprising a relief bore in the said cylinder wall extending toward the said chamber from a point in the said wall contacted by an intermediate portion of the flat annular surface of the said ring when the said end of the said piston wall is at its closest proximity to the said chamber, said relief bore having a diameter in the neighborhood of .021 inch greater than the inside diameter of the said wall and substantial length, said piston wall having a smaller outside diameter in a portion thereof spaced from the said ring and extending to the said end than in the remaining portion thereof so as to form with the juxtapositioned relief bore and cylinder wall a restricted annular conduit from the said chamber of uniform width and sufficient length to effect a turbulence to the flow of fluid from the said chamber sufficient to scour the conduit surfaces free of abrasive deposit.

RUDOLPH B. KLEINFELD.

REFERENCES CITED

The following references are of record in the file of this patent:

UNITED STATES PATENTS

| Number | Name | Date |
|---|---|---|
| 909,531 | Brady | Jan. 12, 1909 |
| 1,326,501 | Hentschke | Dec. 30, 1919 |
| 1,345,808 | Reynolds | July 6, 1920 |
| 1,616,391 | Prouty | Feb. 1, 1927 |
| 1,684,407 | Nibbs | Sept. 18, 1928 |

FOREIGN PATENTS

| Number | Country | Date |
|---|---|---|
| 339,748 | France | June 17, 1904 |
| 574,013 | France | July 4, 1924 |